United States Patent [19]
Tani et al.

[11] Patent Number: 4,731,135
[45] Date of Patent: Mar. 15, 1988

[54] PROCESS FOR MAKING A FILTER HAVING A CONTINUOUS DENSITY GRADIENT

[75] Inventors: Yatsuhiro Tani, Kyoto; Susumu Ohmori; Hideki Komagata, both of Otsu, all of Japan

[73] Assignees: Toyo Boseki Kabushiki Kaisha; Nippon Denso Company, Ltd., both of Japan

[21] Appl. No.: 837,574

[22] Filed: Mar. 4, 1986

Related U.S. Application Data

[60] Continuation of Ser. No. 627,586, Jul. 3, 1984, abandoned, which is a division of Ser. No. 522,248, Aug. 10, 1983, abandoned, which is a continuation of Ser. No. 320,984, Nov. 12, 1981, abandoned.

[30] Foreign Application Priority Data

Nov. 12, 1980 [JP]  Japan ................................ 55-159959

[51] Int. Cl.⁴ .............................................. D04H 3/12
[52] U.S. Cl. ............................... 156/62.6; 55/DIG. 5; 156/181; 156/283; 156/285
[58] Field of Search ....................... 156/62.6, 228, 283, 156/285, 305, 307.3, 583.5, 180, 181; 55/487, DIG. 5; 264/122, 136, 137

[56] References Cited

U.S. PATENT DOCUMENTS

| | | | |
|---|---|---|---|
| 2,476,282 | 7/1949 | Castellan | 156/283 X |
| 3,102,014 | 8/1963 | Aitkenhead | 55/487 X |
| 3,399,516 | 9/1968 | Hough, Jr. et al. | 264/137 X |
| 3,418,187 | 12/1968 | Reeder et al. | 156/283 X |
| 3,463,689 | 8/1969 | Palmai | 55/DIG. 5 X |
| 3,904,798 | 9/1975 | Vogt et al. | 55/487 X |
| 4,164,400 | 8/1979 | Wald | 55/487 X |
| 4,257,791 | 3/1981 | Wald | 55/487 X |

FOREIGN PATENT DOCUMENTS

| | | | |
|---|---|---|---|
| 0499186 | 1/1954 | Canada | 156/62.6 |
| 2905423 | 8/1980 | Fed. Rep. of Germany | 55/487 |

Primary Examiner—Donald E. Czaja
Assistant Examiner—Ramon R. Hoch
Attorney, Agent, or Firm—Jones, Tullar & Cooper

[57] ABSTRACT

A filter for removing dusts from fluids, which comprises fibers bonded each other with a binder and/or hot-pressed, having a fiber density of 0.01 to 0.1 at the side of inflow of fluid to be treated and a fiber density of 0.05 to 0.5 at the side of outflow of the fluid with a continuous fiber density gradient and having a uniform distribution of fiber material in direction of thickness, and a process for the production thereof. The filter is particularly useful as an air filter for automobiles or air conditioner.

1 Claim, 7 Drawing Figures

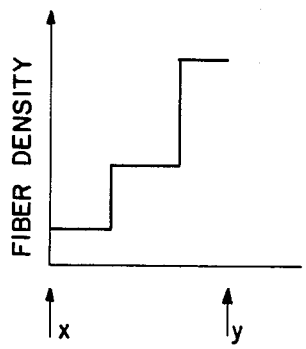
FIG. IA
PRIOR ART
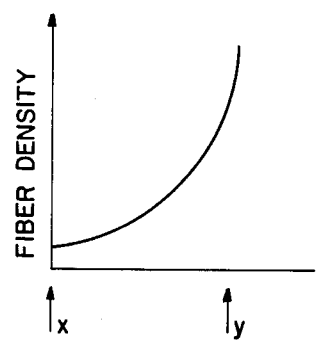
FIG. IB
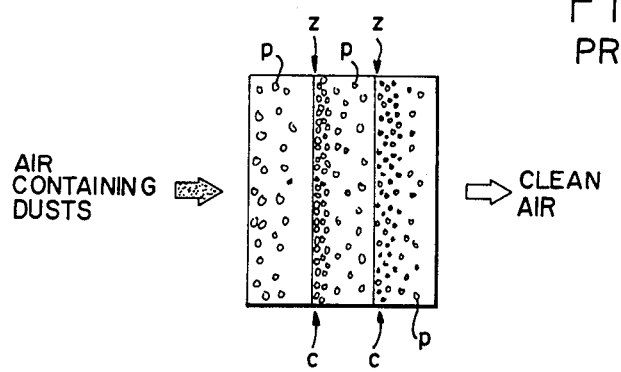
FIG. 2A
PRIOR ART
FIG. 2B

PROCESS FOR MAKING A FILTER HAVING A CONTINUOUS DENSITY GRADIENT

This is a continuation of application Ser. No. 627,586 filed on July 3, 1984, abandoned, which is a division of application Ser. No. 522,248 filed Aug. 10, 1983, abandoned, which is a continuation of application Ser. No. 320,984, filed Nov. 12, 1981, abandoned.

The present invention relates to a filter useful for removing dusts from fluids with high dust collection efficiency and less clogging and a process for the production of the same.

There have hitherto been known some laminated filters for removing dusts from fluids with high dust collection efficiency and little clogging, which are produced by laminating two or more non-woven fabrics having different kinds of fiber materials, different fiber deniers, different fiber densities and different thickness so that a non-woven fabrics having small fiber density (sparse fiber layer) positions at the side of flowing in of fluid to be treated and a non-woven fabric having large fiber density (dense fiber layer) positions at the side of flowing out of fluid after treated.

These laminated filters are produced by various processes, for example, by piling up various non-woven fabrics or by putting up a plenty of webs of different fibers followed by treating with a resin, and are usually used as a filter for gases such as an air filter for air-conditioner, an air filter for automobiles, or as a filter for liquids such as a fuel or oil filter for automobiles and airplanes. The laminated filters are superior to a filter having a single non-woven fabric layer in less clogging and higher dust-holding capacity, but still have a drawback in small dust-holding capacity per space volume thereof. That is, it tends to occur clogging even when the laminated filters have a relatively large space volume being not utilized and to increase rapidly the fluid permeation resistance and result in finish of life thereof. Accordingly, the known laminated filters are not necessarily satisfactory in view of inferior space utilization.

The above drawback of the laminated filters may be due to easy formation of dust cake at the side of inflow of fluid which is unavoidable in case of laminated filters produced by laminating various non-woven fabrics wherein each non-woven fabric has a uniform fiber density.

As a result of the present inventors' intensive study, it has been found that an excellent filter having higher dust collection efficiency with less clogging can be obtained by producing a single layer filter under specified conditions so that the single layer has a continuous fiber density gradient (from sparse phase to dense phase) between the side of inflow of fluid to be treated and the side of outflow of fluid.

An object of the present invention is to provide an improved filter for removing dusts from fluids having high dust collection efficiency with less clogging. Another object of the invention is to provide a filter having a continuous fiber density gradient in a single layer. A further object of the invention is to provide a process for the production of the improved filter. These and other objects as well as advantages of the present invention will be apparent to persons skilled in the art from the following description.

The filter of the present invention is a single layer filter comprising fibers bonded each other with a binder and/or hot-pressed, having a fiber density of 0.01 to 0.1 at the side of inflow of fluid to be treated and a fiber density of 0.05 to 0.5 at the side of outflow of fluid with a continuous fiber density gradient and having a uniform distribution of fiber material in direction of thickness. The single layer filter may be used alone, or two or more of the single layer filter may be used together in the form of a multiple filter or further after piling up with a conventional non-woven fabric as explained hereinafter. The filter of the present invention can be produced by passing a gas dispersed with a binder powder through webs of a fiber density of $7 \times 10^{-4}$ to $1 \times 10^{-2}$ at a flow rate of not more than 4 m/second, by which the binder of 10 to 80% by weight based on the weight of webs is adhered to the webs so that the adhered amount of the binder becomes rich at the side of surface layer of the webs and becomes poor at the opposite side, followed by hot-contact bonding.

The filter of the present invention is characteristic in that it is a single layer filter having a continuous fiber density gradient and having uniform distribution of fiber material, contrary to the known laminated filters formed by laminating two or more non-woven fabrics, wherein each non-woven fabric has a uniform fiber density but the non-woven fabric in one layer has a different fiber density from that of fabric in another layer, that is, the layer of the laminated filter at the side of inflow of fluid to be treated is composed of a non-woven fabric having a uniform low fiber density (sparse fiber layer) and the layer at the side of outflow of fluid is composed of a non-woven fabric having a uniform high fiber dinsity (dense fiber layer), and hence, the laminated filters have different fiber densities stepwise.

The uniform distribution of fiber material in the present filter means that the distribution of fiber material is uniform at any position in direction of thickness of the filter. For example, when the webs forming the filter consist of two kinds of fibers, a fiber of 1 denier and a fiber of 3 denier, both fibers are uniformly mixed at any position in direction of thickness.

The present invention is illustrated in more detail with reference to the accompanying drawing.

FIG. 1, A shows a degree of fiber density in direction of thickness of the known laminated filter, e.g. three-layer laminated filter. FIG. 1, B shows a degree of fiber density in direction of thickness of a filter of the present invention.

FIGS. 2, A and B are schematic sectional views showing the state of collected dusts in a known three-layer laminated filter and a filter of the present invention, respectively.

Figure 3:
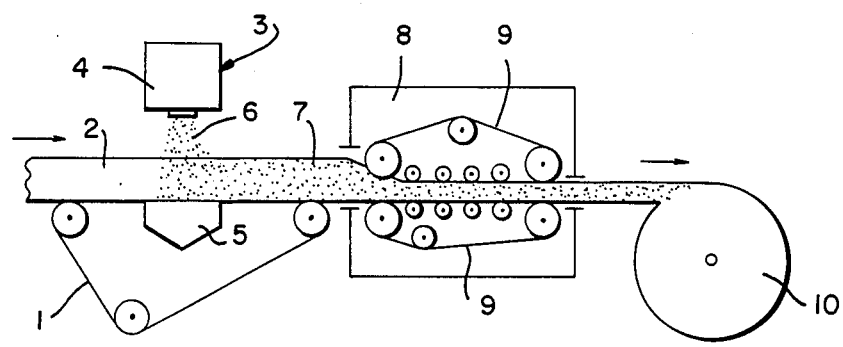
FIG. 3 shows a flow of steps for producing a filter by the present invention.

Referring to FIG. 1, A, in the known three-layer laminated filter, the fiber density increases stepwise from the side of inflow of fluid (x) to the side of outflow of fluid (y), but on the other hand, referring to FIG. 1, B, in the single layer filter of the present invention, the fiber density varies continuously from the side of inflow of fluid (x) to the side of outflow of fluid (y).

The filter of the present invention has a fiber density of 0.01 to 0.1 at the side of inflow of fluid and that of 0.05 to 0.4 at the side of outflow of fluid, and has preferably a loose fiber density gradient at the side of inflow (x) and a sharp fiber density gradient at the side of outflow (y).

The fiber density of the filter of the present invention may be controlled so as to fit to the kinds and particle distribution of dusts contained in the fluid to be treated, but the fiber density gradient is preferably approximately shown by an exponential curve, i.e. a curve of the following equation.

$$\alpha = \alpha_i \cdot \exp \cdot \left( \frac{a}{\sqrt[3]{\alpha_i}} \times \frac{l}{l_o} \right)$$

wherein:
α: a fiber density at a distance: l,
αHD i: a fiber density at the side of inflow of fluid,
a: a constant: 0.35–0.64,
$l_o$: a thickness of the filter, and
l: a distance from face at the side of inflow of fluid in direction of thickness.

When the fiber density gradient at the side of inflow of fluid is larger (sharp), the filter shows a lower dust-holding capacity, and when the fiber density gradient at the side of outflow of fluid is smaller (loose), the filter shows inferior dust collection efficiency. The fiber density in the present invention denotes a ratio ($cm^3/cm^3$) of a total volume of the fibers contained in the filter to a total volume of space in the filter.

The fibers used in the present filter include regular yarns having round section and also special yarns having various other sections such as Y-shape section, X-shape section, C-shape section. Examples of the fibers are natural fibers such as cotton fiber, hempen fiber, wool fiber, or asbestos fiber, semi-synthetic fibers such as rayon fiber, viscose fiber or cellulose acetate fiber, synthetic fibers such as polyamide fiber (e.g. nylon fiber), polyester fiber, polyolefin fiber, polyvinylidene fluoride fiber, or sheath-core mixed type fibers therefrom, inorganic fibers such as glass fiber, rock wool fiber, slag wool fiber, or metallic fiber. The denier of the fibers is not specified, but usually in the range of 0.001 to 15 d, preferably 0.001 to 5 d. These fibers may be used alone or in combination of two or more kinds thereof. When two or more fibers are used together, they are uniformly mixed, because the filter of the present invention should have uniform distribution of fiber materials at any position.

The filter of the present invention consisting of a single layer may be used alone for removing dusts from fluids with a high dust collection efficiency and less clogging, but two or more of the single layer filters may be used as a multiple filter by piling up them. Moreover, the single layer filter or multiple filter may also be piled up with a conventional non-woven fabric in order to give them higher degree of specision in the dust-holding capacity.

Since the filter of the present invention has a fiber density gradient, it shows a remarkably large space utilization for collecting dusts and hence has a great dust-holding capacity. Referring to FIG. 2, A, according to the known three layer laminated filter, the dust particles (p) are collected as being biassed to the side of inflow of fluid (z) in each layer to form a dust cake (c), which results in significant increase of permeation resistance and finally finishes its life. The FIG. 2, A shows schematically the state of collected dusts in the known laminated filter just before the life is finished. On the contrary, as is shown in FIG. 2, B, according to the filter of the present invention, even when the same amounts of dusts are collected, the dust particles (p) are uniformly collected in the direction of thickness and do not form any dust cake, because the present filter has a continuous fiber density gradient and hence the dust collection efficiency varies continuously from low efficiency to high efficiency between the side of inflow of fluid to the side of outflow of fluid.

Because of the excellent dust-holding capacity, the filter of the present invention is particularly useful as an air filter for air conditioner or an air filter for automobiles, but is also useful for other various utilities as the conventional laminated filters.

The filter of the present invention can be produced, for example, by the process as shown in FIG. 3.

On a screen conveyor (1), webs of fiber (2) are put, and thereon a binder (4) is sprayed from a binder dispersing machine (3). The binder-containing gas (6) is sucked with a suction box (5), by which the binder is penetrated into the webs. The binder-containing webs (7) are then transferred into an electric furnace (8), wherein the webs are hot-pressed with a pair of belts (9). The filter thus formed is wound onto a wind-up roll (10).

Figure 5:
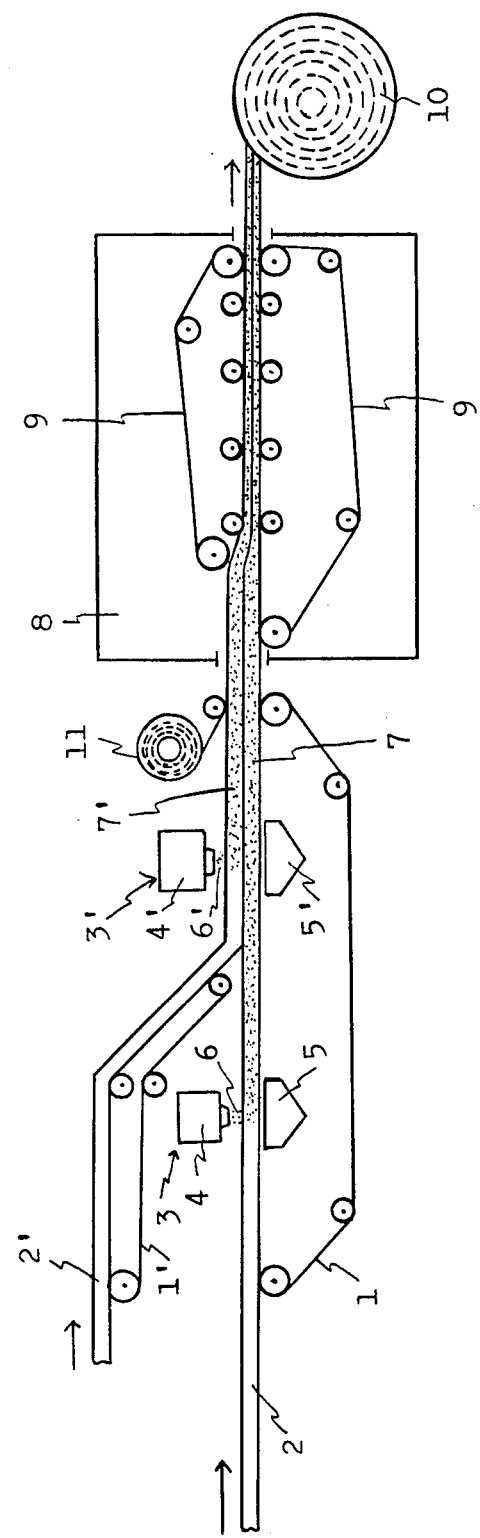
FIG. 5 shows a flow of steps in another embodiment of a process for the production of a filter by the present invention.

Another embodiment of the process of the present invention is shown in FIG. 5. According to this embodiment, a three layer filter consisting of two kinds of webs and a non-woven fabric is produced. Firstly, webs (2) are put on a belt conveyor (1), and thereto a binder is sprayed and penetrated like in FIG. 3. Onto the binder-containing webs (7), another webs (2') carried on a belt conveyor (1') are piled up and thereto a binder (4') is sprayed from a binder dispersing machine (3'), and the binder-containing gas (6') is sucked with a suction box (5') to form a binder-containing webs layer (7'). Thereafter, a non-woven fabric (11) is piled up onto the layer (7'), and the thus formed three layer sheet is transferred into an electric furnace (8) and treated in the same manner as in FIG. 3.

According to the process of the present invention, the binder is penetrated and dispersed within the webs with an adhesion amount gradient in direction of thickness (poor adhesion amount to rich adhesion amount) by passing a binder-containing gas (e.g. air) through webs at a flow rate of not higher than 4 m/second. This dispersion of binder within the webs can be carried out by spraying a binder with a spray gun, e.g. a spray gun for electrostatic powder coating onto the surface of webs and simultaneously sucking the binder-containing gas with a suction box as is shown in FIGS. 3 and 5. Alternatively, it may be carried out by dispersing and floating a quantitative amount of a binder in a fixed width with a rotary screen or a gravure roll.

The webs used in the present invention has a fiber density of $7 \times 10^{-4}$ to $1 \times 10^{-2}$. The webs having a comparatively small fiber density may be obtained by giving fibers crimp spontaneously or mechanically, and the webs having a comparatively large fiber density may be obtained by compressing such webs or from non-crimped webs. When the webs have a fiber density smaller than $7 \times 10^{-4}$, the binder can hardly be adhered onto the webs because the binder passes through the webs without being adhered, and hence, the desired adhesion amount gradient can hardly be obtained. On the other hand, when the fiber density is larger than $1 \times 10^{-2}$, the binder deposits predominantly on the surface of webs.

When the binder-containing gas (e.g. air), i.e. an air wherein the binder is dispersed and floated, is passed through the webs at a flow rate of not higher than 4 m/second, the binder contained in the gas is adhered onto the webs in such an adhesion amount distribution that the adhesion amount of binder becomes larger at the surface of webs layer and is rapidly decreased with distance from the surface to the reverse side of the webs layer. When the flow rate of the binder-containing gas is larger than the above rate, 4 m/second, the binder adhered onto the webs is easily scattered from the webs, and hence, it is difficult to control the adhesion amount of binder.

In the process of the present invention, the binder-containing webs are hot-pressed in the electric furnace. In this step, the webs have a fiber density of not higher than 0.2, but not lower than the fiber density of the starting webs. When the webs are hot-pressed, the binder contained therein is molten and then effects to bond each adjacent fibers in the webs. The number of bonding point varies with the adhesion amount of binder in the webs. That is, when the adhesion amount of binder is rich, the number of bonding point is many, and when the adhesion amount of binder is poor, the number of bonding point is small. After passing the step of hot-pressing, the webs layer is released from pressing, and thereby, the thickness of the webs layer is somewhat recovered than that during the step of hot-pressing in the electric furnace. The elastic recovery of the webs layer is smaller when the adhesion amount of binder is rich, and is larger when the adhesion amount of binder is poor, by which the continuous fiber density gradient is given. When the fiber density of the webs in the hot-pressing step is larger than 0.2, the bonding of fibers is effected not only between the adjacent fibers but also between fibers in surrounding area, by which the elastic recovery of the webs layer becomes smaller even after release from pressing, and hence, the desired fiber density gradient is hardly obtained. Besides, when two or more webs are piled up and the binder is adhered with an adhesion amount gradient in each webs, or when a non-woven fabric is further piled up thereon, followed by hot-pressing as in the process shown in FIG. 5, there can be obtained a multiple filter having a higher degree of specision in the dust-holding capacity.

The binder used in the present invention includes thermosetting resins such as phenol resins, melamine resins, epoxy resins, urea resins, alkyd resins, unsaturated polyester resins, silicone resins, urethane resins, or diallyl phthalate resins, thermoplastic resins such as polyamides, polyesters, polyethylene, polypropylene, polyvinyl chloride, polyvinyl acetate, polyvinyl alcohol, polyvinylidene chloride, polytetrafluoroethylene, or the like, which may be in the form of a powder or a liquid. When a powdery binder is used, it has a particle size of 1 to 150μ, preferably 10 to 100μ. When the fibers have smaller denier, the binder has preferably smaller particle size. Besides, the particle distribution of binder may be a polydisperse distribution or a monodisperse distribution. The powdery binder may be in a particle shape or alternatively may be a powdery fiber.

The binder is adhered onto the webs in an adhesion amount of 10 to 80% by weight based on the weight of webs. When the adhesion amount of binder is over 80% by weight, the elastic recovery of the webs layer becomes smaller when released from pressing in hot-pressing step, and hence, the fiber density gradient is hardly obtainable or the space for collecting dusts becomes smaller, which results inadvantageously in lowering of the dust-holding capacity. On the other hand, when the adhesion amount of binder is smaller than 10% by weight, the number of bonding point between fibers decreases and the filter obtained shows inferior dimensional stability, and hence, there can not be obtained the desired filter.

The present invention is illustrated by the following Examples I–V but is not limited thereto. The following Reference Examples 1–14 illustrate comparison filters produced in a manner differing from that of the present invention.

EXAMPLE I

A filter was produced by the process as shown in FIG. 3.

Webs (2) consisting of a polyester fiber of 3 denier (fiber weight per square meter: 400 g/m$^2$, fiber density: $2 \times 10^{-3}$) were put on a screen conveyor (1) which ran at a rate of 1 m/minute. Onto the webs, a powdery binder (4) of a colored copolyester was sprayed at a rate of 60 g/m$^2$ from a binder dispersing machine (3) with a spray gun for powder coating, and simultaneously, the binder-containing air (6) was sucked at a rate of 1.0 m/second via the webs (2) and the screen conveyor (1) with a suction box (5) which was provided under the screen conveyor (1). The powdery binder-containing webs (7) was then transferred into an electric furnace (8) of 130° C., wherein the webs were hot-pressed in a thickness of 3 mm with a pair of belts (9) which were coated with a polytetrafluoroethylene (Teflon, a tradename of Du Pont). After releasing from pressing, at which the elastic recovery was measured, the hot-pressed webs were wound up onto a wind-up roll (10) to give a filter having a thickness of 5 mm, a surface fiber density of 0.11, a reverse side fiber density of 0.03, and a continuous fiber density gradient. It was observed by a reflective microscope that the colored binder was rich in the surface area of the filter and the adhesion amount thereof was gradually decreased with the distance from the surface to the reverse side, i.e. there was an adhesion amount gradient.

The filter thus obtained was subjected to the following test.

The filter was provided onto a dusting tester (filtration area: 79 cm$^2$), and thereto was supplied an air containing #8 testing dust (as defined in JIS) at a flow rate of 30 cm/second, and there were measured the initial collection efficiency at the point of permeation resistance increase of 10 mm H$_2$O, and an average collection efficiency and a dust-holding amount at the point of permeation resistance increase of 200 mm H$_2$O, The results are shown in Table 1.

TABLE 1

| Increase of permeation resistance (mm H$_2$O) | Collection efficiency (%) | Dust-holding amount (g/m$^2$) |
| --- | --- | --- |
| 10 | 96.3 | — |
| 200 | 99.7 | 2920 |

REFERENCE EXAMPLES 1 AND 2

For comparison purpose, a single layer filter was produced in the same manner as described in Example 1 except that the same powdery binder as used in Example 1 was uniformly dispersed and adhered to card webs consisting of a polyester fiber of 3 denier (fiber weight per square meter: 400 g/m$^2$) and the hot-pressing of the webs was done in a thickness of 2.5 mm. The single layer filter thus obtained had a uniform fiber density (Reference Example 1).

Besides, a known three layer laminated filter was produced from a non-woven fabric consisting of a polyester fiber of 6 denier (fiber weight per square meter: 110 g/m$^2$, thickness: 2 mm), a non-woven fabric consisting of a polyester fiber of 3 denier (fiber weight per square meter: 120 g/m$^2$, thickness: 1 mm), and a non-woven fabric consisting of a rayon fiber of 1.5 denier (fiber weight per square meter: 150 g/m$^2$, thickness: 0.5 mm) (Reference Example 2).

The collection efficiency and dust-holding amount of these filters in reference examples were measured in the same manner as in Example 1. The results are shown in Table 2.

TABLE 2

| Ref. Ex. No. | Increase of permeation resistance (mm H$_2$O) | Collection efficiency (%) | Dust-holding amount (g/m$^2$) |
| --- | --- | --- | --- |
| Ref. Ex. 1 | 10 | 95.1 | — |
|  | 200 | 99.5 | 820 |
| Ref. Ex. 2 | 10 | 96.3 | — |
|  | 200 | 99.6 | 1360 |

As is clear from the comparison the results in Table 1 with those in Table 2, the filter of the present invention (Example 1) was the same as the laminated filter of Reference Example 2 in the collection efficiency, but was about two times of the latter in the dust-holding amount. The single layer filter of Reference Example 1 had a uniform fiber density and hence was inferior to the filter of the present invention both in the collection efficiency and the dust-holding amount.

EXAMPLE II

Onto card webs consisting of a mixture of 60% by weight of a polyester fiber of 1 denier and 40% by weight of a polyester fiber (triangle shape section) of 3 denier (fiber weight per square meter: 140 g/m$^2$, having uniform denier distribution in direction of thickness), an air containing the same powdery binder as used in Example 1 was passed at a flow rate of 0.3 m/second, and thereby the powdery binder was adhered to the polyester fibers in the webs, wherein the binder was adhered rich at the surface area and the adhesion amount was decreased with the distance from the surface to the reverse side of webs.

The resulting webs were hot-pressed at 140° C. in a gauge thickness of 1 mm for 2 minutes. After releasing from pressing, the elastic recovery was measured. There was obtained a single layer filter of a thickness of 1.2 mm, which had a fiber density at the side of inflow of 0.02 and a fiber density at the side of outflow of 0.09 and a continuous fiber density gradient.

The collection efficiency and dust-holding amount of the filter were measured in the same manner as in Example 1. The results are shown in Table 3.

REFERENCE EXAMPLE 3

For comparison purpose, a filter was produced in the same manner as described in Example 2 except that there were used webs having uneven fiber distribution which consisted of 100% by weight of a polyester fiber of 1 denier at the surface area of the webs with increasing in straight line the content of a polyester fiber having triangle shape section of 3 denier from the surface to the reverse side of the webs and becoming 100% by weight of the polyester fiber having triangle shape section of 3 denier at the reverse side of the webs (fiber weight per square meter: 140 g/m$^2$). The properties of the filter were also measured likewise. The results are shown in Table 3, too.

TABLE 3

| Ex. No. | Increase of permeation resistance (mm H$_2$O) | Collection efficiency (%) | Dust-holding amount (g/m$^2$) |
| --- | --- | --- | --- |
| Ex. 2 | 10 | 98.0 | — |
|  | 200 | 99.7 | 490 |
| Ref. Ex. 3 | 10 | 98.2 | — |
|  | 200 | 99.7 | 260 |

REFERENCE EXAMPLES 4 TO 7

Four different kinds of filters having different fiber densities between the sides of inflow and outflow of fluid with continuous fiber density gradient as shown in Table 4 were produced by using the same card webs as used in Example 2 in the same manner as described in Example 2 except that the conditions of hot-pressing temperature and gauge thickness were varied. The properties of these filters were measured likewise. The results are shown in Table 4.

TABLE 4

| Ex. No. | Increase of permeation resistance (mm H$_2$O) | Collection efficiency (%) | Dust-holding amount (g/m$^2$) | Fiber density at the side of inflow | Fiber density at the side of outflow |
| --- | --- | --- | --- | --- | --- |
| Ref. Ex. 4 | 10 | 98.8 | — | 0.08 | 0.50 |
|  | 200 | — | 65 |  |  |
| Ref. Ex. 5 | 10 | 98.2 | — | 0.007 | 0.16 |
|  | 200 | — | 220 |  |  |
| Ref. Ex. 6 | 10 | 98.5 | — | 0.15 | 0.20 |
|  | 200 | — | 70 |  |  |
| Ref. Ex. 7 | 10 | 95.1 | — | 0.01 | 0.04 |
|  | 200 | — | 380 |  |  |

EXAMPLES III AND IV

Card webs consisting of a polyester fiber of 5 denier were held between two screens of 50 mesh and pressed so as to be a fiber density of $1 \times 10^{-3}$ and $4 \times 10^{-3}$. On these webs a powdery binder of a phenol resin from a powdery binder dispersing machine provided upper the webs was sprayed, and the binder-containing air was penetrated into the webs at a flow rate of 1.5 m/second with a suction box provided under the webs, whereby the binder was adhered to the fibers so as to be rich at the side of inflow of fluid and to be poor at the side of outflow. The binder-containing webs were hot-pressed at 130° C. with a pressing machine so as to be a fiber density of 0.15 to give two filters.

The filters were subjected to the dusting test by using #2 testing dust (silica sand powder, defined in JIS) under the conditions of a filtration area: 79 cm$^2$, a flow rate of test fluid: 1.2 m/second, and a dust concentration in the fluid: 1 g/m$^3$. The initial collection efficiency at the point of permeation resistance increase of 10 mm H$_2$O and the dust-holding amount at the point of permeation resistance increase of 200 mm H$_2$O were measured. The results are shown in Table 5.

REFERENCE EXAMPLES 8 AND 9

For comparison purpose, the same webs as used in Examples 3 and 4 were held between two screens of 50 mesh and pressed so as to be a fiber density of $5 \times 10^{-4}$ and $1.5 \times 10^{-2}$. The webs were treated in the same manner as described in Examples 3 and 4, and the properties of the filters thus obtained were measured likewise. The results are shown in Table 5, too.

TABLE 5

| Ex. No. | Fiber density of the webs ($cm^3/cm^3$) | Adhesion amount of binder ($g/m^2$) | Thickness of filter (mm) | Dusting property Initial collection efficiency (%) | dust-holding amount ($g/m^2$) |
| --- | --- | --- | --- | --- | --- |
| Ref. Ex. 8 | 0.0005 | 37 | 1.2 | 99.3 | 800 |
| Ex. 3 | 0.001 | 42 | 1.8 | 98.9 | 2900 |
| Ex. 4 | 0.004 | 40 | 2.5 | 98.2 | 3200 |
| Ref. Ex. 9 | 0.015 | 43 | 3.7 | 71.2 | 3100 |

As is clear from the above results, the filters of Examples 3 and 4 showed large dust-holding amount with a high initial collection efficiency.

Figure 4:
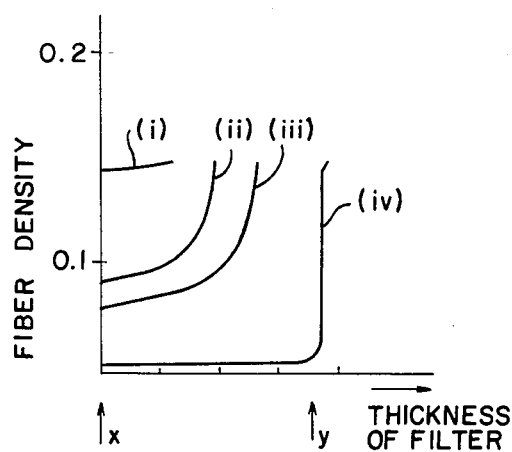
FIG. 4 shows the variation of fiber density in direction of thickness in a known laminated filters and the present filter.

The change of fiber density in direction of thickness in each filter is shown in FIG. 4, wherein (i) is the change of fiber density of the filter in Reference Example 8, (ii) is that of the filter in Example 3, (iii) is that of the filter in Example 4, and (iv) is that of the filter in Reference Example 9. In case of Reference Example 8, the fiber density of webs was small at the spraying of the powdery binder, and the powdery binder was adhered comparatively uniformly in direction of thickness and the webs were hot-pressed with keeping the uniform fiber density, and hence, the obtained filter showed inferior dust-holding capacity. In case of Examples 3 and 4, the filters had a loose gradient of fiber density at the side of inflow of fluid (x) and a sharp gradient of fiber density at the side of outflow of fluid (y), and the fiber density gradient was approximately in an exponential curve, and hence, the filters showed excellent dust-holding capacity. In case of Reference Example 9, the fiber density of webs was large at the spraying of the powdery binder, and hence, the powdery binder adhered merely on the surface area of webs, that is, the phase being effective on the initial collection efficiency was merely restricted to the surface area of the filter.

EXAMPLE V

A multiple filter consisting of two webs (2 and 2') and non-woven fabric (11) was produced by the process as shown in FIG. 5.

Two kinds of webs (2 and 2') were put on screen conveyors (1 and 1') which ran at a rate of 1.5 m/minute, respectively. To the webs (2 and 2') were adhered powdery binders of a copolyester (4 and 4') under the conditions of a supplying amount of the binder: 10 g/minute and 30 g/minute, and a flow rate of airs containing the binders by sucking with suction boxes (5 and 5'): 1.0 m/second in each suction. The binder-containing webs (7 and 7') were piled up with a non-woven fabric (11) and the piled sheet was hot-pressed in an electric furnace (8) at 130° C.

The webs (2) used above consisted of a polyester fiber of 6 denier, and had a fiber weight per square meter of 400 g/m² and a fiber density of $2.3 \times 10^{-3}$. The webs (2') consisted of a polyester fiber of 2 denier, and had a fiber weight per square meter of 100 g/m² and a fiber density of $3.0 \times 10^{-3}$. The non-woven fabric (11) consisted of a polyester fiber and had a fiber weight per square meter of 50 g/m². The hot-pressing was done at a gauge thickness of 4.5 mm, and the filter thus obtained had a thickness of 6.2 mm.

The filter was provided onto a dusting tester (filtration area: 79 cm²), and thereto was supplied an air containing #7 testing dust (as defined in JIS) at a flow rate of 30 cm/second, and there were measured the initial collection efficiency at the point of permeation resistance increase of 10 mm H₂O, and an average collection efficiency and a dust-holding amount at the point of permeation resistance increase of 200 mm H₂O. The results are shown in Table 6.

TABLE 6

| Increase of permeation resistance (mm H₂O) | Collection efficiency (%) | Dust-holding amount ($g/m^2$) |
| --- | --- | --- |
| 10 | 99.0 | — |
| 200 | 99.9 | 4500 |

REFERENCE EXAMPLES 10 TO 13

Various filters were produced in the the same manner as described in Example 1 except that the adhesion amount of binder and the fiber density at the hot-pressing were varied as shown in Table 7. The properties of the filters were measured likewise. The results are shown in Table 7. As is clear from the results, the filters showed inferior balance in the collection efficiency and the dust-holding amount.

TABLE 7

| Ex. No. | Adhesion amount of binder (% by weight) | Fiber density at hot-pressing | Increase of permeation resistance (mm H₂O) | Collection efficiency (%) | Dust-holding amount ($g/m^2$) | Initial permeation resistance (mm H₂O) |
| --- | --- | --- | --- | --- | --- | --- |
| Ref. Ex. 10 | 100 | 0.12 | 10 | 98.5 | — | 21 |
|  |  |  | 200 | — | 65 |  |
| Ref. Ex. 11 | 150 | 0.30 | 10 | — | — | Extremely large |
|  |  |  | 200 | — | — |  |
| Ref. Ex. 12 | 40 | 0.30 | 10 | 98.7 | — | 15 |
|  |  |  | 200 | — | 60 |  |
| Ref. Ex. 13 | 5 | 0.13 | 10 | 96.1 | — | 5 |
|  |  |  | 200 | — | 400 |  |

The filter obtained in Reference Example 11 showed almost no air permeation because of film-formation of the binder, and it could not be used as a filter.

REFERENCE EXAMPLE 14

A filter was produced in the same manner as described in Example 1 except that the flow rate of the binder-containing air was 5 m/second. The filter showed a collection efficiency of 97.9% (at the point of permeation resistance increase: 10 mm H₂O) and a dust-holding amount of 180 g/m² (at the point of permeation resistance increase: 200 mm H₂O), which were not satisfactory.

What is claimed is:

1. A process for the production of a filter having an inlet side and an outlet side and comprising fibers bonded to each other with a binder, said filter having a fiber density of 0.01 to 0.1 at the inlet side and a fiber density of 0.05 to 0.5 at the outlet side and having a continuous fiber density gradient from the inlet side to the outlet side while having a uniform distribution of the different types of fibers, comprising the steps of:

drawing a gas, containing a powdery binder having a particles size of 1 to 150$\mu$, by suction through webs having a fiber density of $7 \times 10^{-4}$ to $1 \times 10^{-2}$ at a flow rate of not more than 4 m/second, thereby adhering the binder to the fibers of the webs in an amount of 10 to 80% by weight to the total weight of webs so that the adhered amount of the binder is rich at the inlet side and is poor at the outlet side;

hot-pressing the binder-containing webs at a fiber density of not higher than 0.2; and recovering the webs from the pressing.

* * * * *

UNITED STATES PATENT AND TRADEMARK OFFICE
CERTIFICATE OF CORRECTION

PATENT NO. : 4,731,135
DATED : March 15, 1988
INVENTOR(S) : Yatsuhiro TANI et al It is certified that error appears in the above-identified patent and that said Letters Patent is hereby corrected as shown below:

ON TITLE PAGE: Item [73]

Please change the second assignee from "Nippon Denso Company, Ltd.," to -- NIPPONDENSO CO., LTD.--.

Signed and Sealed this

Twenty-eighth Day of April, 1992

Attest:

HARRY F. MANBECK, JR.

*Attesting Officer*         *Commissioner of Patents and Trademarks*